Dec. 8, 1942.   R. A. SEIDENSTRICKER   2,304,753
ROTARY FEEDING DEVICE
Filed July 26, 1940   3 Sheets-Sheet 1
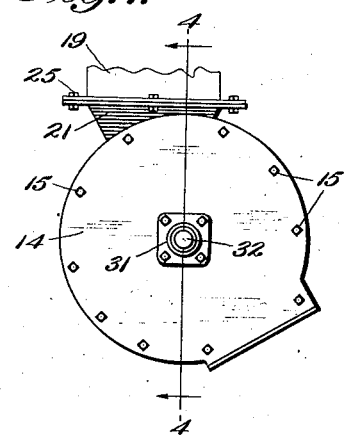
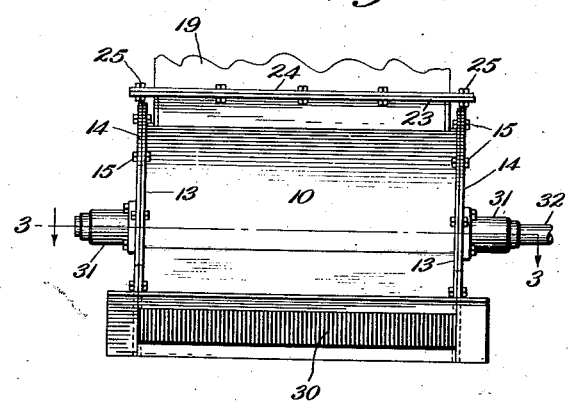
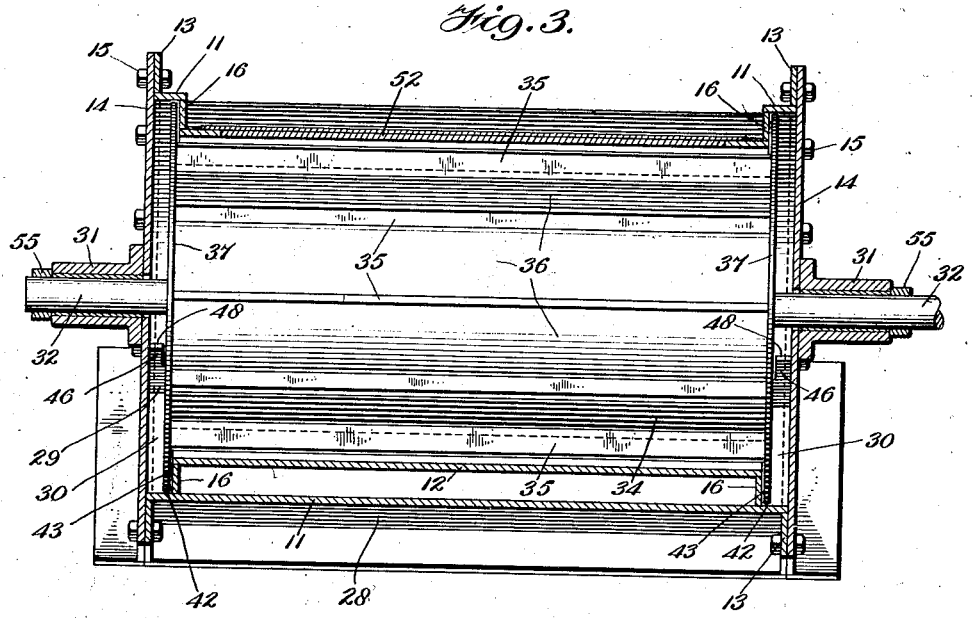
Inventor.
Regis A. Seidenstricker,
By
B. B. Collings.
Attorney Dec. 8, 1942.  R. A. SEIDENSTRICKER  2,304,753
ROTARY FEEDING DEVICE
Filed July 26, 1940  3 Sheets-Sheet 2

Inventor
Regis A. Seidenstricker,
By
B. B. Collins.
Attorney

Dec. 8, 1942.   R. A. SEIDENSTRICKER   2,304,753
ROTARY FEEDING DEVICE
Filed July 26, 1940   3 Sheets-Sheet 3

Inventor
Regis A. Seidenstricker,
By
B. B. Collings
Attorney

Patented Dec. 8, 1942

2,304,753

UNITED STATES PATENT OFFICE 2,304,753

ROTARY FEEDING DEVICE

Regis A. Seidenstricker, Milwaukee, Wis., assignor to Chain Belt Company, Milwaukee, Wis., a corporation of Wisconsin Application July 26, 1940, Serial No. 347,732

10 Claims. (Cl. 221—136)

The invention relates to a rotary feeding device, and has for one of its objects to provide apparatus of this character which will be simple in construction, comparatively inexpensive to manufacture, and more efficient in use than those which have been heretofore proposed.

In the feeding of foundry sand, for example, from a supply hopper or bin to a belt conveyer by which it is carried to the molds, it is desirable that the feed be more or less uniform and subject to accurate control. Where rotary feeders are employed for this purpose, it is desirable that unintentional escape of sand between the moving and stationary parts of the apparatus be prevented in so far as possible, in order that the feed and control may be accurate and also that clouds of fine particles or dust which may be injurious to the health of the workmen may be eliminated.

In many of the rotary feeding devices heretofore employed, attempts have been made to prevent this unwanted escape of sand, with its attendant dust clouds and inaccurate feed and control, through the use of packings or friction seals between the moving and stationary parts, but because of the abrasive character of the material, such packings and seals have a relatively short life and need frequent replacement.

It is one of the principal objects of the present invention to provide a rotary feeder construction in which such packings and/or friction seals are dispensed with in favor of running clearances between the moving and stationary parts, and in which provision is made for the retention within the casing of the apparatus of such fine particles as may find their way through such clearances.

A further object of the invention is to provide a construction which may be conveniently fabricated for the most part from metal plates which are stamped, cut or burned to shape and welded together where necessary to effect permanent connections.

With the above and other objects in view, which will appear as the description proceeds, the invention consists in the novel details of construction, and in the novel combinations and arrangements of parts, more fully hereinafter disclosed and particularly pointed out in the appended claims.

Referring to the accompanying drawings forming a part of this specification, in which like reference characters designate like parts in all the views:

Figure 1 is an end elevational view of a rotary feeder constructed in accordance with the invention;

Fig. 2 is a front elevational view of the parts shown in Fig. 1, as seen from the right of said figure;

Fig. 3 is an enlarged horizontal sectional plan view, taken approximately on the plane indicated by the line 3—3 of Fig. 2, looking down;

Figure 4:
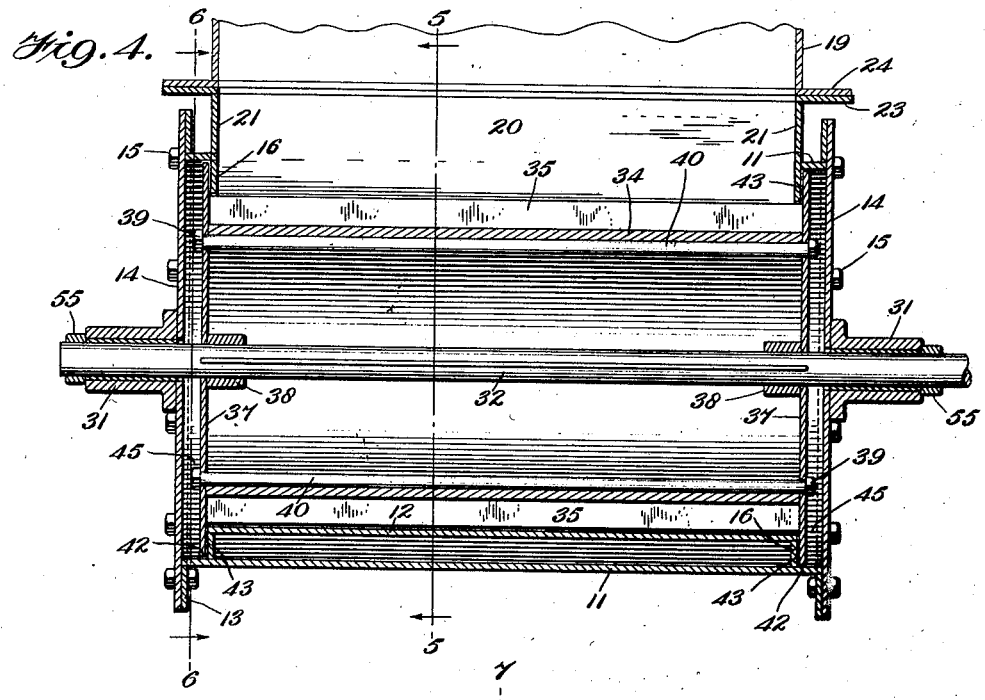
Fig. 4 is a vertical sectional view, taken approximately on the plane indicated by the line 4—4 of Fig. 1, looking in the direction of the arrows.
Figure 5:
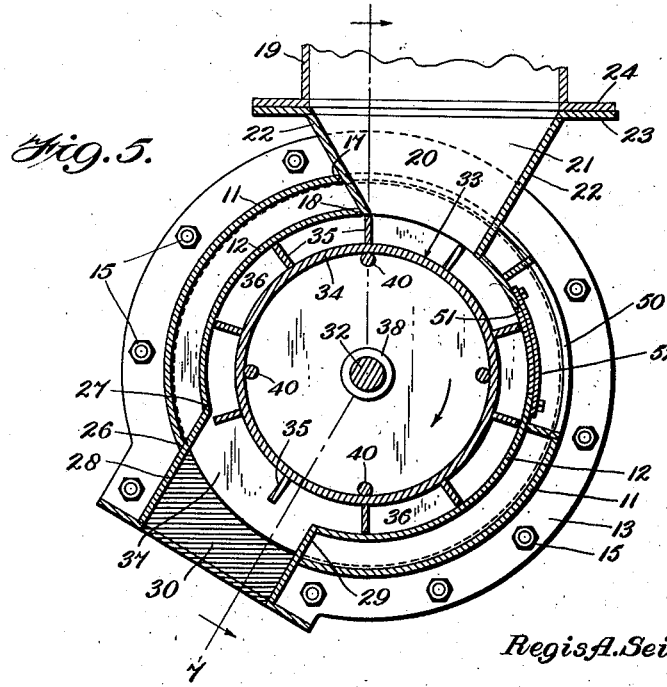
Figure 6:
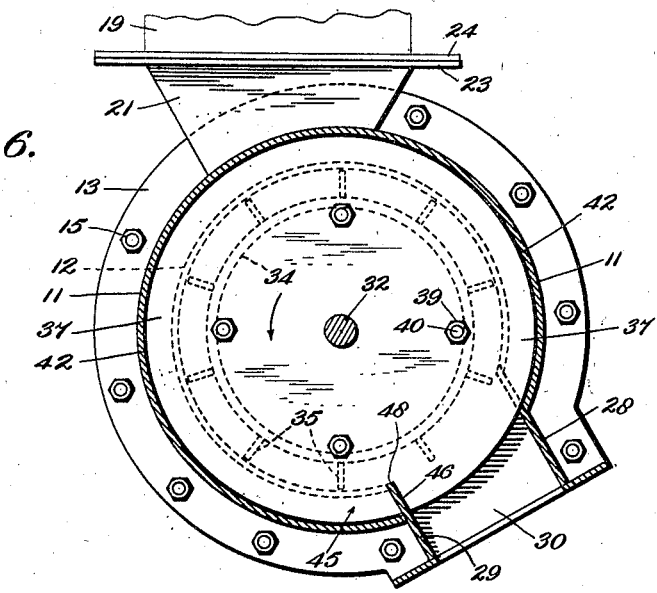
Figure 7:
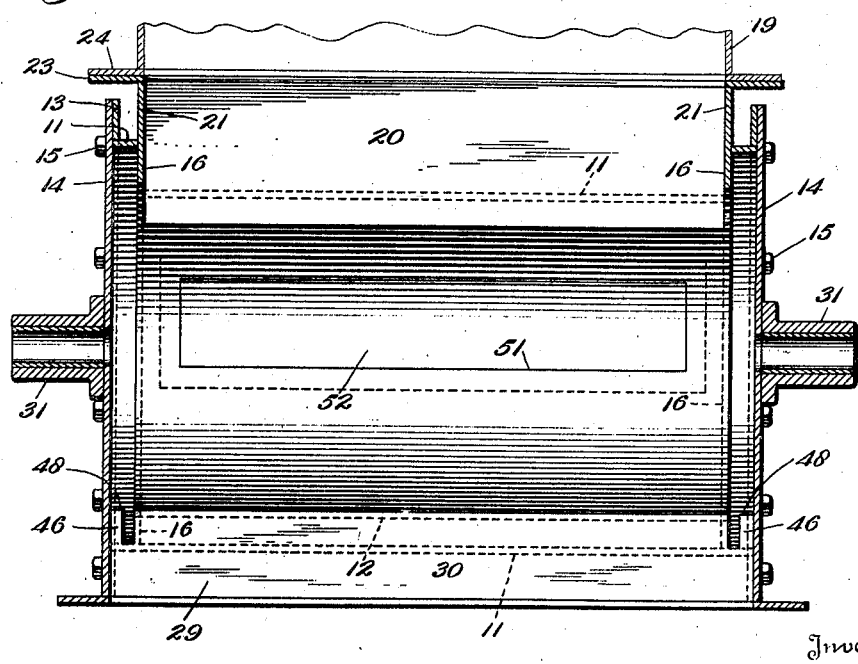

Figs. 5 and 6 are transverse sectional views, taken respectively on the planes indicated by the lines 5—5 and 6—6 of Fig. 4, looking in the directions of the arrows; and Fig. 7 is a longitudinal vertical sectional view through the casing or stationary part of the apparatus, taken approximately on the planes indicated by the line 7—7 of Fig. 5, looking in the direction of the arrows.

In the said drawings the feeder is illustrated as comprising a tubular casing 10 composed of an outer perimetral wall 11 and an inner perimetral wall 12 spaced therefrom. The outer wall is provided at its ends with flanges 13 to which end plates 14 for closing the housing ends are removably secured as by bolts 15. Within the outer wall 11 the housing is provided with the annular transverse partition walls 16 spaced somewhat longitudinally from the end walls 14, which partition walls receive and support the inner peripheral wall 12 which terminates flush with the outer surfaces of the said partition walls, as will be clear from Figs. 3, 4 and 7.

The outer and inner perimetral walls 11 and 12 are provided with apertures 17 and 18, respectively, for admission of the material to be fed from a hopper or bin 19, an inlet passage 20 being formed between the said hopper and apertures by end walls 21, which constitute extensions of the annular partition walls 16, and side walls 22 as will be clear from the drawings. The upper portion of the said inlet passage structure may be provided with a flange 23 which is secured to a companion flange 24 formed on the hopper 19 by suitable bolts 25 as indicated in Figs. 1 and 2.

At approximately the opposite side of the housing the perimetral walls 11 and 12 are cut away as at 26 and 27, respectively, preferably although not necessarily offset somewhat from the vertical center line, to provide for an outlet passage which is here shown as being formed by spaced longitudinally extending walls 28 and 29, the latter of which extends the full distance between the end plates 14 of the housing, which latter plates constitute the end walls of the outlet passage 30.

The said end walls 14 of the housing have suitably secured to them journal bearings 31 in which is journalled a shaft 32 to which is keyed or otherwise suitably secured the feeding drum 33. As here shown this drum comprises a tubular member 34 of somewhat less diameter than the inner peripheral wall 12 and having welded or otherwise rigidly secured upon its outer periphery a plurality of longitudinally extending vanes 35 which form pockets or compartments 36 for the reception of the material as it is fed from the inlet passage 20. These vanes 35 have a running clearance with the inner surface of the inner perimetral wall 12 as will be clear from Figs. 5 and 6. The said feeding drum is provided with the end plates 37 having hubs 38 by means of which the drum is mounted upon the shaft 32, see Fig. 4, the said end plates being retained in position by nuts 39 threaded upon through bolts 40 which may be welded to the inner circumference of the tubular member 34. The said end plates 37 have a diameter slightly less than the internal diameter of the outer peripheral wall 11 so as to have a running clearance 42 therewith and the tubular member 34 is of such length that the outer circumferential portions of the end plates also have running clearances 43 with the outer faces of the transverse annular partition walls 16, as will be readily understood from Figs. 3 and 4. It thus results that although no friction or rubbing seals are provided between the moving and stationary parts of the apparatus, at the same time the clearances therebetween are such as will tend to prevent the unwanted discharge of material being fed between the moving and stationary surfaces of the device.

However, of course some of the finer particles of the material will unavoidably work their way through these clearances and when they do they will be received in the spaces 45 between the end walls 14 of the housing and the end plates 37 of the drum.

As best shown in Figs. 3, 6 and 7 the end portions 46 of the wall 29 of the outlet passage 30 extend inwardly into the spaces 45 between the end walls 14 and end plates 37 thereby forming pockets into which the fines of the material which work their way through the clearances 42 and 43 will be received and normally prevented from being discharged to form an objectionable dust cloud. In actual operation the amount of material which is received into the pockets 45 is relatively small and the apparatus may be operated for a considerable length of time before the pockets will become filled with the fines to an extent sufficient for the latter to overflow the inner edge 48 of the inwardly projecting portions 46 of the longitudinal wall 29, but when the pockets do become filled with fines beyond the angle of repose of the material such fines will spill over the said inner edge 48 and be discharged through the outlet passage 30, which, as above noted, extends completely to the end walls 14 and thereby communicates with the spaces or pockets 45. Of course, whenever the pockets 45 become overloaded they may be emptied by removing the end plates 14 and cleaning out the collected material.

The outer peripheral wall 11 may be cut away as at 50 and the inner peripheral wall 12 provided with a clean out aperture 51 which may be normally closed by a suitable closure plate 52.

The shaft 32 may be driven from any suitable source of power not shown, and the clearances 43 between the end plates 37 of the drum and the annular partition walls 16 of the housing may be preserved by suitable set collars 55 secured to the said shaft. If the apparatus is used with a weighing scale which receives the said material, the driving motor may be automatically shut off and the feed stopped whenever a predetermined amount of material has been weighed. On the other hand the time to feed a certain amount of any given material may be first experimentally determined for any given motor speed and thereafter with the feeder operating at the same speed the required batch of material may be fed by timing the rotation of the drum.

While one form of the invention has been illustrated and described it is obvious that those skilled in the art may vary the details of construction as well as the precise arrangement of parts without departing from the spirit of the invention and therefore it is not wished to be limited to the above disclosure except as may be required by the claims.

What is claimed is:

1. A packless dust-reducing rotary feeding device for granular, pulverulent and like materials, comprising a housing having end walls; a rotatable feeding drum mounted in said housing with its ends spaced from said housing end walls, portions of said drum ends having running clearances with portions of said housing constituting the sole means for preventing the escape of the material being fed from the drum to said housing; and means in the spaces between the housing and drum ends forming pockets for the reception and retention of at least a portion of such material as may work its way through said clearances.

2. A packless dust-reducing rotary feeding device for granular, pulverulent and like materials, comprising a housing having end walls and a perimetral outlet opening; a rotatable feeding drum mounted in said housing with its ends spaced from the end walls of the housing, portions of said drum ends having running clearances with portions of the housing which prevent the escape from the drum to the housing of at least the major portion of the material being fed; and means forming pockets adjacent said outlet opening in the spaces between the drum and housing ends, for the reception and retention of at least a portion of such material as may work its way through said clearances.

3. A packless dust-reducing rotary feeding device for granular, pulverulent and like materials, comprising a housing having end walls and an outlet opening; a rotatable feeding drum mounted in said housing with its ends spaced from the end walls thereof to provide material-receiving spaces which communicate with said outlet opening, portions of said drum ends having running clearances with portions of said housing which constitute the sole means for preventing the escape from the drum to said spaces of the material being fed; and a wall in said spaces forming pockets therein for the retention, at least up to the angle of repose, of such portions of the material as may work their way through said clearances.

4. A packless dust-reducing rotary feeding device for granular, pulverulent and like materials, comprising a housing having end walls and a perimetral outlet opening; a rotatable feeding drum mounted in said housing with its ends spaced from said housing end walls to provide material-receiving spaces which communicate with said outlet opening, portions of said drum ends having running clearances with portions of said housing which prevent the escape from the drum to said spaces of at least the major portion of the material being fed; and a substantially radial wall in said spaces partially restricting the communication between the latter and the outlet opening, and forming pockets adjacent the latter for the retention, up to the angle of repose, of such portions of the material as may work their way through said clearances, while providing for the escape of excess material to said outlet opening.

5. A packless dust-reducing rotary feeding device for granular, pulverulent and like materials, comprising a housing having end walls and interior transverse partition walls extending completely around its perimeter and spaced from said end walls; a rotatable feeding drum mounted in said housing, having end walls which include flanges spaced from the end walls of the housing and adjacent the partition walls thereof to provide running clearances constituting the sole means for preventing the escape of the material being fed from the drum to the spaces between the respective end walls of the drum and housing; and means in said spaces providing pockets for the reception and retention of material which may work its way through said clearances.

6. A rotary feeding device for granular, pulverulent and like materials, comprising a housing having removable end walls and interior annular transverse partition walls spaced from said end walls; and a feeding drum journaled in said housing, extending through said annular partition walls and having end plates between the partition and end walls providing flanges having running clearances with said partition walls, said drum end plates being spaced from said housing end walls to provide pockets for receiving fines of the material being fed which may work their way through said clearances.

7. A rotary feeding device for granular, pulverulent and like materials, comprising a tubular housing having outer and inner spaced perimetral walls, removable end walls, and annular transverse partition walls spaced from said end walls, said inner perimetral wall terminating short of said end walls and being supported by said annular partition walls; and a feeding drum journaled in said housing for rotation within said inner perimetral wall, said drum having end plates providing flanges having running clearances with said partition and outer perimetral walls, said plates being spaced from said end walls to provide pockets for receiving fines of the material being fed which may work their way through said clearances.

8. A rotary feeding device for granular, pulverulent and like materials, comprising a tubular housing having end walls, annular transverse partition walls spaced from said end walls, and inlet and outlet passages for the material, the latter including a longitudinal wall extending from one end wall to the other; and a feeding drum journaled in said housing extending through said annular partition walls and having end plates between the partition and end walls having running clearances with said partition walls, said drum end plates being spaced from said end walls, and portions of said longitudinal wall of the outlet passage extending into the spaces between said end plates and end walls to provide pockets for receiving fines of the material being fed which may work their way through said clearances.

9. A rotary feeding device for granular, pulverulent and like materials, comprising a tubular housing having spaced outer and inner perimetral walls, end walls secured to the outer perimetral wall, annular transverse partition walls spaced from said end walls, and inlet and outlet passages for the material, the latter including a longitudinal wall extending from one end wall to the other, said inner perimetral wall terminating short of said end walls and being supported by said annular partition walls; and a feeding drum journaled within said housing for rotation within said inner perimetral wall, said drum being provided with end plates between the partition and end walls having running clearances with said partition and outer perimetral walls, said drum end plates being spaced from said end walls, and portions of said longitudinal wall of said outlet passage extending into the spaces between said end walls and plates to provide pockets for receiving fines of the material being fed which may work their work through said clearances.

10. A rotary feeding device for granular, pulverulent and like materials, comprising a tubular housing having spaced outer and inner perimetral walls, end walls secured to said outer wall, annular transverse partition walls spaced from said end walls, and inlet and outlet passages for the material, the latter being offset from the vertical and including a longitudinal wall extending from one end wall to the other, said inner perimetral wall terminating short of said end walls and being supported by the annular partition walls; and a feeding drum journaled in said housing for rotation within said inner perimetral wall, said drum being provided with end plates between the partition and end walls having running clearances with said partition and outer perimetral walls, said end plates being spaced from said end walls, and portions of said longitudinal wall of said outlet passage extending into the spaces between said end walls and plates to provide pockets for receiving fines of the material being fed which may work their way through said clearances, said pockets communicating with said outlet passage over said longitudinal wall portions, whereby excess fines collected in said pockets may pass to said outlet passage.

REGIS A. SEIDENSTRICKER.